United States Patent
Lippert et al.

(10) Patent No.: US 6,356,906 B1
(45) Date of Patent: Mar. 12, 2002

(54) STANDARD DATABASE QUERIES WITHIN STANDARD REQUEST-RESPONSE PROTOCOLS

(75) Inventors: Lisa M. Lippert, Seattle; Joel M. Soderberg, Duvall; Saveen V. Reddy, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,508

(22) Filed: Jul. 26, 1999

(51) Int. Cl.[7] .............................................. G06F 17/30
(52) U.S. Cl. ....................... 707/10; 707/513; 345/733; 345/751
(58) Field of Search .................. 707/1–4, 100–103, 707/501, 513, 501.1; 709/217–219; 345/733, 751, 760

(56) References Cited

U.S. PATENT DOCUMENTS 5,826,258 A * 10/1998 Gupta et al. .................... 707/4
6,083,276 A * 7/2000 Davidson et al. ............... 717/1
6,085,186 A * 7/2000 Christianson et al. .......... 707/3

OTHER PUBLICATIONS

"XML: A Door to Automated Web Applications," Khare et al., IEEE Internet Computing, Viol. 1, No. 4, pp. 78–87, Jun. 1997.*

"Using Server Side XML to create individualized Web Pages," Mark Baker, Proceedings of the 1998 IEEE International Conference, vol. 2, pp. 317–319, Sep. 23, 1998.*

"XML–Based Information Mediation with MIX," Baru et al., Proceedings of the 1999 ACM SIGMOD, pp. 597–599, May 31, 1999.*

"An XML–baesd Wrapper Generator for Web Information Extraction," Liu et al., Proceedings of the 1999 ACM SIGMOD, pp. 540–543, May 31, 1999.*

HTTP Working Group Internet Draft dated Nov. 18, 1998, prepared by Fielding, et al., available on the web site http://www.w3.org. [Chapter 1 is specifically provided].

W3C Recommendation REC–xml–1998–0210 dated Feb. 10, 1998, and available on the web site http://www.w3.org.

E. James Whitehead Jr., World–Wide–Web Distributed Authoring and Versioning (WebDAV): An Introduction, in StandardView, vol. 5, No. 1, Mar. 1997, pp. 3–8.

Internet Engineering Task Force (IETF) Request for Comment (RFC) 2518, entitled HTTP Extensions for Distributed Authoring, by Y. Goland, E. Whitehead, A. Faizi, S. Carter and D. Jensen, dated Feb. 1999.

ISO/IEC 9075:1992, Database Language SQL, Jul. 30, 1992, available from and produced by the International Organization for Standardization (ISO) in liason with the International Electrotechnical Commission (IEC), specifically the Joint Technical Committee ISO/IEC JTC1, Information Processing Systems. [Introduction is specifically provided].

(List continued on next page.)

Primary Examiner—Hosain T. Alam
(74) Attorney, Agent, or Firm—Workman, Nydegger, Seeley (57) ABSTRACT

Standard database queries within standard request-response protocols is disclosed. A database query according to a predetermined query language such as SQL is first wrapped according to a predetermined markup language such as XML. The query is then also wrapped according to a predetermined transport protocol such as HTTP. The resulting twice-wrapped database query can then be submitted from a client to a server over a TCP/IP-compliant network, such as the Internet, for example.

31 Claims, 3 Drawing Sheets

OTHER PUBLICATIONS

Chris Date and Hugh Darwen, A Guide to the SQL Standard: A User's Guide to the Standard Database Language SQL, Apr. 1997, ISBN 0201964260.

Internet Web Site http://www.microsoft.com/data/oledb/, last updated Mar. 17, 1999.

Internet Web Site http://www.microsoft.com/data/oledb/oledb20/, printed Jul. 23, 1999.

Internet Web Site http://www.microsoft.com/com/, printed Jul. 23, 1999.

Internet Web Site http://www.microsoft.com/com/about.asp, printed Jul. 23, 1999.

Network Working Group Request for Comment (RFC) 1738 entitled Uniform Resource Locators (URL), by T. Berners–Lee, L. Masinter, M. McCahill, dated Dec. 1994.

Network Working Group Request for Comment (RFC) 2396 entitled Uniform Resource Identifiers (URI): Generic Syntax, by T. Berners–Lee, R. Fielding, L. Masinter, dated Aug. 1998.

* cited by examiner

FIG. 1

STANDARD DATABASE QUERIES WITHIN STANDARD REQUEST-RESPONSE PROTOCOLS

FIELD OF THE INVENTION

This invention relates generally to standard request-response protocols such as the HyperText Transport Protocol (HTTP), and more specifically to standard database queries, such as Structure Query Language (SQL) queries, within such standard requestresponse protocols.

BACKGROUND OF THE INVENTION

The HyperText Transport Protocol (HTTP) has emerged as the standard mechanism by which information is transported over TCP/IP (Transmission Control Protocol/Internet Protocol) compatible networks, such as the Internet, intranets, and extranets. HTTP is more specifically an application-level protocol for distributed, collaborative, hypermedia information systems. It is a generic, stateless, protocol that can be used for many tasks beyond its use for hypertext, such as name servers and distributed object management systems, through extension of its request methods, error codes and headers. It is referred to as a transport protocol, since information is transported according to its specifications, and is also referred to as a request-response protocol, since information is exchanged by a client making a request of a server, which generates a response thereto. HTTP as referred to herein refers generally to any standard of HTTP, and specifically to HTTP/1.1, as described in the HTTP Working Group Internet Draft dated Nov. 18, 1998, prepared by Fielding, et al., and available on the web site http://www.w3.org.

A common use of HTTP is the transport of information formatted according to a markup language. For example, a popular application of the Internet is the browsing of world-wide-web pages thereof. In such instances, typically the information retrieved is in HyperText Markup Language (HTML) format, as transported according to HTTP. However, other standard markup languages are emerging. One such markup language is eXtensible Markup Language (XML). XML describes a class of data objects that are referred to as XML documents, and partially describes the behavior of computer programs that process them. A primary difference between HTML and XML is that within the former, information content is intertwined with the layout of the content, making their separation difficult, for example. Conversely, within XML a description of the storage layout and logical structure of content is maintained separate from the content itself. However, both XML and HTML are subsets of a markup language known as Standard Generalized Markup Language (SGML). XML as referred to herein refers generally to any standard of XML, and specifically to XML 1.0, as described in the W3C recommendation REC-xml-19980210 dated Feb. 10, 1998, and also available on the web site http://www.w3.org.

A limitation to HTTP, however, is that it does not have defined extensions for standard database queries. Database queries are typically generated by clients for transmission to servers maintaining a database, so that the client can, for example, determine specific information contained in the database. A database query language is referred to as a language in which database queries can be formulated. The most popular database query language is the Structured Query Language (SQL). Thus, SQL is a database language that allows clients to formulate queries to obtain information from databases stored on servers. SQL as referred to herein refers generally to any standard of SQL, and specifically to the version of SQL known within the art as either SQL 92, SQL2, or SQL 1992. SQL 92 is specifically described in ISO/IEC 9075:1992, Database Language SQL, Jul. 30, 1992, available from and produced by the International Organization for Standardization (ISO) in liaison with the International Electrotechnical Commission (IEC), specifically the Joint Technical Committee ISO/IEC JTC1, Information Processing Systems. SQL is also described in Chris Date and Hugh Darwen, A Guide to the SQL Standard: A User's Guide to the Standard Database Language SQL, April 1997, ISBN 0201964260.

Because HTTP does not provide for SQL queries, clients and servers otherwise connected to the Internet, for example, have no standard mechanism by which to communicate with one another regarding information stored in databases on the servers. A client may have to know the specific and peculiar manner by which a database server expects to receive SQL queries over the Internet. This limits the usability of such database servers. For these and other reasons, there is a need for the present invention.

SUMMARY OF THE INVENTION

The invention relates to standard database queries within standard requestresponse protocols. For example, in one embodiment, a method receives a database query according to a predetermined query language such as SQL. The method wraps the query according to a predetermined markup language, such as XML. The method further wraps the query according to a predetermined transport protocol, such as HTTP. The method outputs the database query as has been wrapped, such that the query can be submitted from a client to a server over a TCP/IP-compliant network, such as the Internet.

Embodiments of the invention therefore provide for advantages not found in the prior art. Computers coupled to TCP/IP-compliant networks such as the Internet, intranets, and extranets can send and receive SQL queries and responses among one another in a standard manner. Because Internet connectivity is becoming increasingly standard for computers, this means that so long as a given computer is able to generate an SQL query, it is then able, for example, to send the query to a server maintaining an SQL database, in a standard manner.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
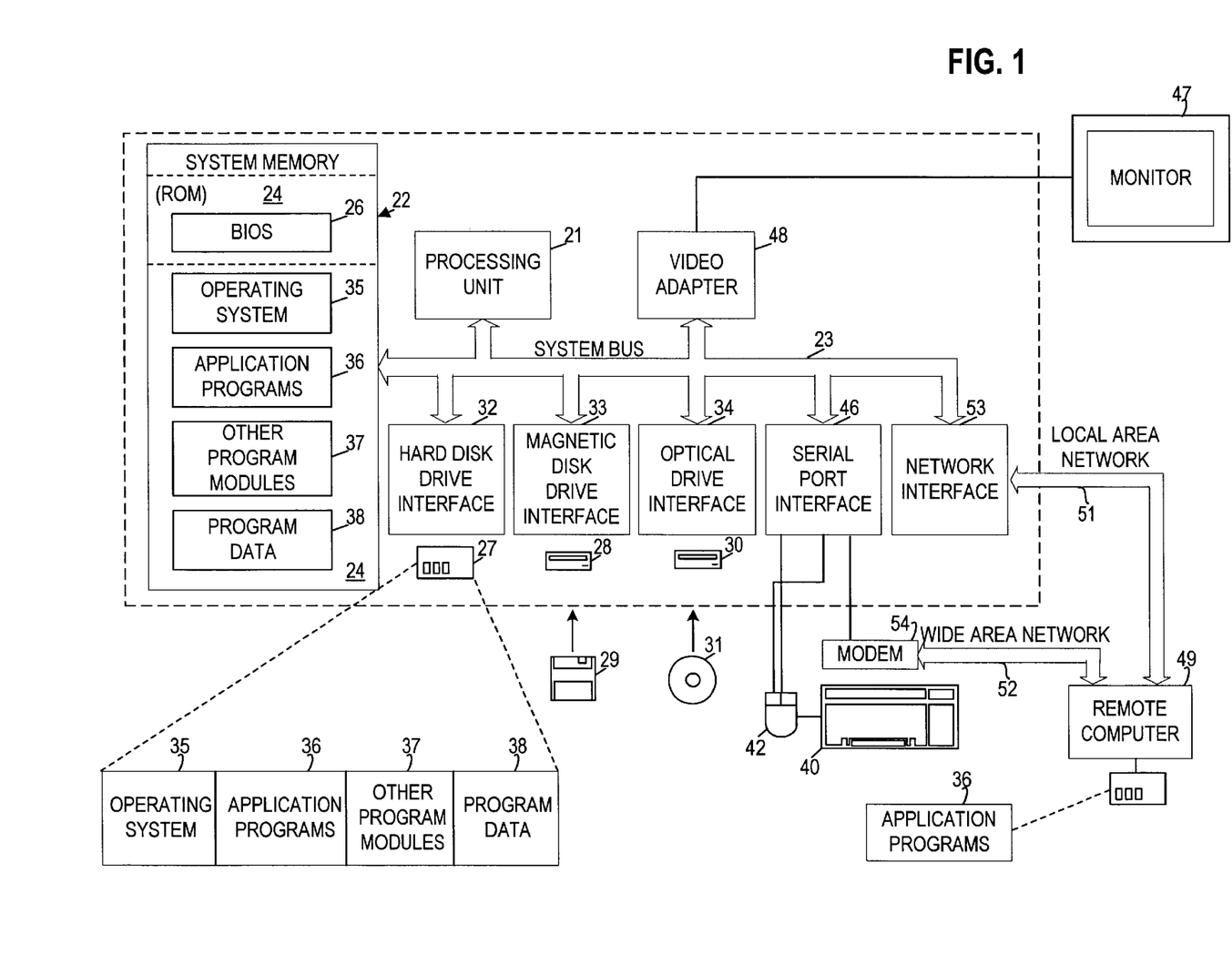
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Wrapping Database Queries and Responses

In this section, description is provided of the manner by which database queries and responses are wrapped first according to a markup language, and then according to a transport protocol, according to one embodiment of the invention. The description is made with reference to FIGS. 2(a) and 2(b), which are diagrams illustrating the wrapping of a query and a response, respectively. The wrapping of queries and responses can be in one embodiment performed as a computer-implemented method. In such instance, the computer-implemented method is desirably realized at least in part as one or more programs running on a computer— that is, as a program executed from a computer-readable medium such as a memory by a processor of a computer. The programs are desirably storable on a machine-readable medium such as a floppy disk or a CD-ROM, for distribution and installation and execution on another computer.

Figure 2A:
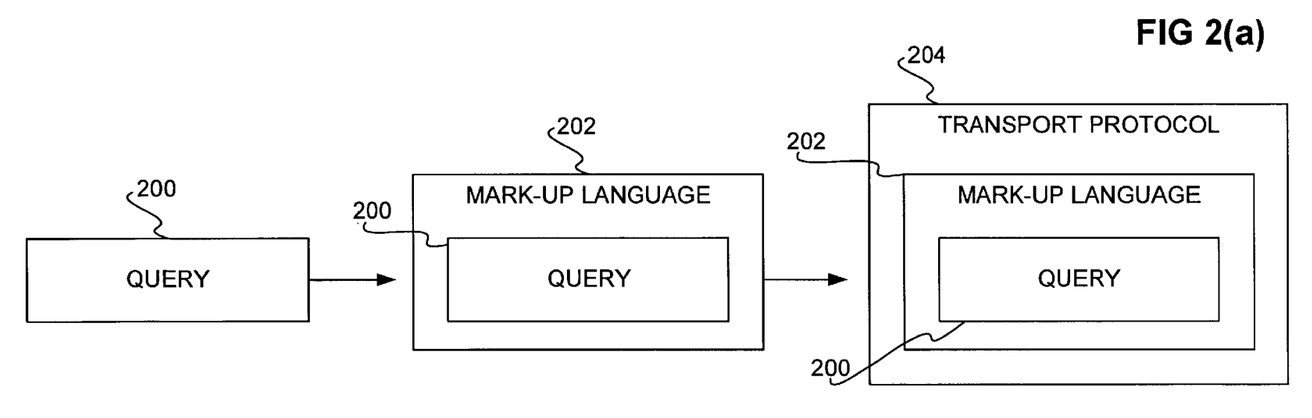
FIG. 2(a) is a diagram showing how a query is wrapped according to a markup language and a transport protocol, according to an embodiment of the invention.

Referring first to FIG. 2(a), a database query 200 according to a predetermined query language is received. In one embodiment, the predetermined query language is SQL, specifically SQL 92 as has been described in the background section. In one embodiment, the query 200 is generated at a client computer, such as the computer described in the previous section of the detailed description. In another embodiment, the query 200 is received by a mechanism such that the query 200 is already generated.

An example query 200 is SELECT*FROM "/". However, the invention is not limited to any particular query. The example query 200 is a SQL 92 query, and asks for all properties in all objects in a specified folder—that is, it asks for any properties of a resource. Thus, the example query 200 is roughly equivalent to a PROPFIND ALL HTTP request, as can be appreciated by those of ordinary skill within the art. The query is desirably in a text format.

Next, the query 200 is wrapped according to a predetermined markup language, as represented by 202 in FIG. 2(a). In one embodiment, the predetermined markup language is XML, specifically XML 1.0 as has been described in the background section. The wrapping is performed as follows.

First, the query 200 is surrounded by predetermined indicators to indicate the start and stop of the query 200. For example, the query can be preceded by <x:sq1> and succeeded by </x:sq1> to indicate the start and stop of the query 200, respectively, where "sq1" specifies that it is a SQL query, and where "x:" specifies the namespace, or context, within which the XML element "sq1" is to be interpreted. (An XML namespace can refer to a standard or schema which defines a set of elements, as can be appreciated by those of ordinary skill within the art; this avoids confusion with any other XML element that could also be named "sq1" but that might have a different meaning). The term resource as used herein specifies any piece of information, such as a Web page, a database, a document, a bitmap image, a computational object stored on a server, etc.

As implied, this means that database queries can be made on resources other than databases. In one embodiment, this means that queries can be used on file systems, where files are considered the rows of a database, the properties are considered the fields of a database, and the folders, as in the case of a collection or a directory thereof, are referred to as the tables of a database. Other resources can have other correspondence to standard databases, as those of ordinary skill within the art can appreciate. The invention is not so limited.

Next, the query 200 is surrounded by predetermined indicators to indicate the predetermined markup language that is used for wrapping, as well as to indicate anything required by that predetermined markup language, such as its version, a particular type of method according to the markup language, and a resource on which the query is to be performed. For example, the query can be preceded by <?xml version="1.0"?> and <x:searchrequest xmlns:x= "DAV:">, and succeeded by </x:searchrequest>. The <?xml version="1.0"?> specifies that XML is the predetermined markup language used, specifically version 1.0. The question marks specify that this is the prologue to the XML document. The xmlns:x="DAV:" specifies the XML name of the resource to be queried—also referred to in the art as the namespace—which in this particular example is "DAV:", such that the namespace can also be referred to by the alias "x". The x:searchrequest specifies that the XML element searchrequest is to be interpreted within the namespace DAV:, which is referred to as "x:", which in this case means that the element contains a search request. Other XML element names and namespaces can be defined and used in a similar manner to encapsulate the query, as can be appreciated by those of ordinary skill within the art.

Next, the query 200 is further wrapped according to a predetermined transport protocol, as represented by 204 in FIG. 2(a). In one embodiment, the predetermined protocol is HTTP, specifically HTTP 1.1 as has been described in the background section. The query 200, as already wrapped according to predetermined markup language, is preceded by predetermined indicators to indicate the transport protocol that is used for wrapping, as well as to indicate anything required by that protocol, such as its version, a host location, content type, connection type, and content-length. For example, the query 200 as wrapped according to the predetermined markup language, as represented by 202 in FIG. 2(a), is preceded by the following:

SEARCH/HTTP/1.1
Host: ryu.com
Content-Type: text/xml
Connection: Close
Content-Length: 243

The SEARCH/HTTP/1.1 specifies that the text that follows relates to a search, and that the transport protocol is HTTP 1.1. The Host: ryu.com specifies the host where the resource is located. The Content-Type: text/xml specifies that what is being sent is text according to the XML markup language. The Connection: Close specifies whether or not the server should try and maintain the network connection after the request is completed, while Content-Length: 243 specifies the size of the request body, in characters. Thus, the entire database query, as wrapped according to the predetermined markup language and according to the predetermined transport protocol, is in the example, SEARCH/HTTP/1.1
Host: ryu.com
Content-Type: text/xml
Connection: Close
Content-Length: 243
<?xml version="1.0"?>
<x:searchrequest xmlns:x="DAV:">
  <x:sql>
  SELECT*FROM "/"
  </x:sql>
</x:searchrequest>

This can then be output. The invention is not limited to the manner of output. For example, it can be sent from a client computer to a server computer over a network, such as the Internet, an intranet, or an extranet, so that the server processes the query and returns a suitable response. Furthermore, in one embodiment, the receiving, wrapping, and outputting of the database query is performed by a client computer. This invention is not limited by the particular HTTP command used to encapsulate the query, in this case the "SEARCH" method is used but another existing or new method such as GET or PROPFIND can be used.

Figure 2B:
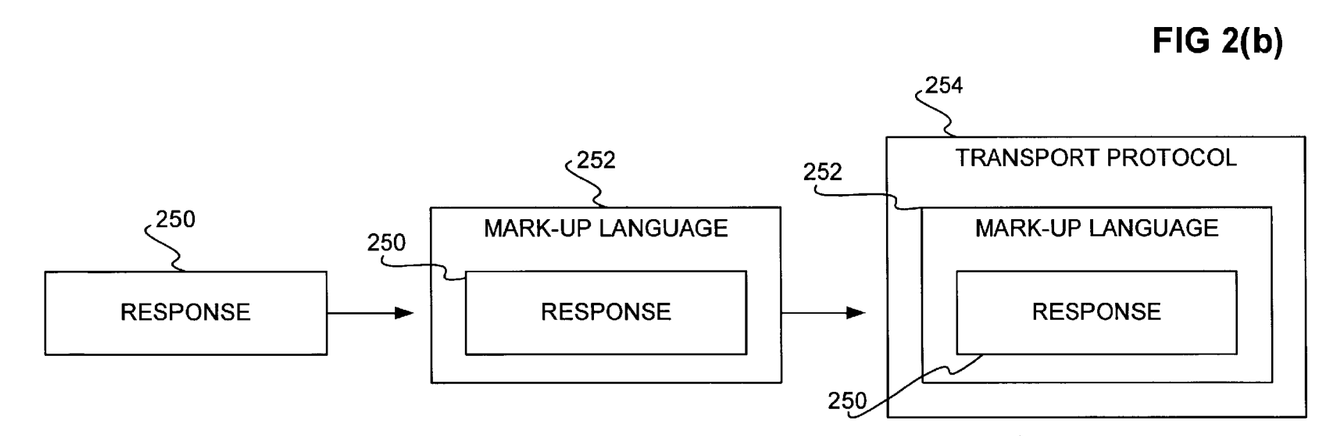
FIG. 2(b) is a diagram showing how a query response is wrapped according to a markup language and a transport protocol, according to an embodiment of the invention; and, FIG. 3 is a diagram of a system according to an embodiment of the invention.

Referring next to FIG. 2(b), a database response 250 according to a predetermined query language is received. In one embodiment, the predetermined query language is SQL, specifically SQL 92 as has been described in the background section. The invention is not limited to the manner by which the response 250 is received. In one embodiment, the response 250 is generated at a server computer, such as the computer described in the previous section of the detailed description. In another embodiment, the response 250 is received by a mechanism such that the response 250 is already generated.

An example response 250, to the example query 200 already described, is the return of all the properties of the specified folder. For example, the folder may have two properties, author and size, where the former is "Tom Jones" and the latter is "100B" to specify 100 bytes. The response is desirably in a text format. The invention is not limited to any particular query response.

Next, the response 250 is wrapped according to a predetermined markup language, as represented by 252 in FIG. 2(b). In one embodiment, the predetermined markup language is XML, specifically XML 1.0 as has been described in the background section. The response 250 is surrounded by predetermined indicators to indicate the start and stop of the response 250. The response 250 is also surrounded by predetermined indicators to indicate the predetermined markup language that is used for wrapping, as well as to indicate anything required by that predetermined markup language, such as its version, status type, and resource locations.

For example, the response 250 as wrapped according to the predetermined markup language, as represented by 252 in FIG. 2(b), can be:

```
<? xml version ="1.0"? >
<x:multistatus xmlns:x ="DAV:"xmlns:y ="FOO:">
    <x:response>
        <x:href>textfile.txt</x:href>
        <x:propstat>
            <x:prop>
                <y:author>Tom Jones</y:author>
                <y:size>100B</y:size>
            </x:prop>
        </x:propstat>
    </x:response>
</x:multistatus>
```

The <?xml version="1.0"?> specifies that XML is the predetermined markup language used, specifically version 1.0. The xmlns:x="DAV:" specifies the XML namespace within which the XML elements prefixed with x: are to be interpreted, such that "DAV:" can also be referred to by the alias "x:", while the xmlns:y="FOO:" specifies an alternate example namespace, which defines the context within which the properties "size" and "author" are to be interpreted, and such that "FOO:" can be referred to using the alias "y:". The x:multistatus specifies the DAV mechanism for reporting success or errors against multiple resources acted upon by a single resource, and that the response was performed within the resource named x, and/x:multistatus delineates the set of responses contained in the XML document. <x:response> indicates the beginning of the response, while </x:response> indicates the end of the response. <x:href> and </x:href> delineate the URL of the resource described by this section of the multistatus response, and <x:prop> and </x:prop> delineate the properties included in the response. The two specific properties of the resource, author and size, which are part of the query response itself, are surrounded by the identifiers <y:author> and </y: author>, and <y:size> and </y:size>, respectively, to indicate their start and end.

Next, the response 250 is further wrapped according to a predetermined transport protocol, as represented by 254 in FIG. 2(b). In one embodiment, the predetermined protocol is HTTP, specifically HTTP 1.1 as has been described in the background section. The response 250, as already wrapped according to predetermined markup language, is preceded by predetermined indicators to indicate the transport protocol that is used for wrapping, as well as to indicate anything required by that protocol, such as its version, content type, and content-length.

For example, the response 250 as wrapped according to the predetermined markup language, as represented by 252 in FIG. 2(a), is preceded by the following:
HTTP/1.1 207 Multi-Status
Content-Type: text/xml
Content-Length: 333
The HTTP/1.1 207 Multi-Status specifies that the transport protocol is HTTP 1.1, where the 207 indicates the HTTP status code, and Multi-Status is the name given to the status code. The Content-Type: text/xml specifies that what is being sent is text according to the XML markup language. The Content-Length: 333 specifies the length of the response body in characters.

The response 250, as wrapped according to the markup language as represented by 252 and as further wrapped according to the transport protocol as represented by 254, can then be output. The invention is not limited to the manner of output. For example, it can be sent from a server computer to a client computer over a network, such as the Internet, an extranet or an intranet, so that the client receives the response to its previously sent query. Furthermore, in one embodiment, the receiving, wrapping, and outputting of the database response is performed by a server computer.

Adaptation of SOL to XML

In the embodiment of the invention where the predetermined query language is SQL and the predetermined markup language is XML, SQL queries may have to be modified in order to conform with XML. These modifications can be performed in accordance with one embodiment as is now described. First, in SQL, a token, which is a small segment of a string, as can be appreciated by those of ordinary skill within the art, appears in single quotes, and the only valid characters within a token are alphabetical characters, unless they are quoted in double spaces. For example, within the SQL construct WHERE CONTAINS ('"foo" AND "bar"'), the token is '"foo" AND "bar"'. Thus, WHERE CONTAINS ('1paste') would not work, such that instead the client must use WHERE CONTAINS('"1paste"').

Second, the SQL operators >, & and < have special meaning in XML, and therefore are replaced as follows. > is replaced by > in one embodiment. & is replaced by & in one embodiment. Finally, < is replaced by < in one embodiment. That is "gt" specifies greater than, "amp" specifies ampersand, and "lt" specifies less than.

Adaptation of SQL to Use in a Hierarchical Namespace

In the case where the resource in question is a collection of folders, as is typical in common HTTP scenarios where the URL namespace can be interpreted as a hierarchy of folders, special identifiers can also be used in one embodiment to specify operations that normally do not have meaning in standard databases. For example, a SCOPE clause can be used as follows in one embodiment. The SCOPE of a query specifies one of the following:

1. '"<url>"'
2. 'EXCLUDE SEARCH OF "<url>"'
3. '[DEEP|SHALLOW] [LATESTVERSION|ALLVERSION] TRAVERSAL OF "<url>"'

In 1., the scope of a query is the resource—i.e., the collection of folders, located at the Universal Resource Locator (URL) address url. In 2, the scope of a query is specified as to exclude searching of a particular resource. In 3., the scope of the query is specified as to DEEP or SHALLOW searching—that is, whether the query should be applied to the current level of folders specified by the url (i.e., SHALLOW), or whether the query should be applied to all levels of folders beginning with the level specified by the url (i.e., DEEP). Furthermore, in 3., the scope of the query is specified as to the latest version of the folders (i.e., LATESTVERSION), or all versions of the folders (i.e., ALLVERSION) that exist. These two specification of scope in 3. are with respect to the traversal of the resource specified by the url.

Extension of SQL to Use XML Data Type Casting

Furthermore, in one embodiment, data type casting is provided for. An argument or data within a database query or response defaults to a data type of string, which is referred to as a sequence of one or more text characters. However, the data type of an argument or data can also be cast as a different data type, such as a particular data type found in XML, such as a binary 64-bit data type specified by "bin.base64". The invention is not limited to any particular set of data types to which data or arguments can be cast. Casting is accomplished according to the format CAST("arg/data" AS "datatype"), where arg/data refers to an argument or data, and datatype refers to a data type. For example, the construct CAST("myprop" AS "bin.base64") means to cast the argument myprop as the data type bin.base64.

Another construct that is provided for in one embodiment is the groupby clause. The groupby clause is most commonly used to obtain a count of the number of items in various categories. For example, the groupby clause can be used to indicate how many items of importance "high," "normal," and "low" are in an email in box. The groupby clause is accomplished according to the format GROUP BY <column>, <column>, . . . , <column>, where each column specifies a column of a database. For example, the construct GROUP BY "DAV: getcontenttype" specifies that the responses in the multistatus response be grouped such that all items have the same value for "DAV:getcontenttype" are returned in one contiguous block. As can be appreciated by those of ordinary skill within the art, the constructs and adaptations listed in this section are for one particular embodiment of adapting SQL to XML. The invention is not particularly limited to using any of these constructs or adaptations, however. Other constructs and adaptations can be used to adapt SQL to XML, or any other database query language to any other markup language, for example.

System

Figure 3:
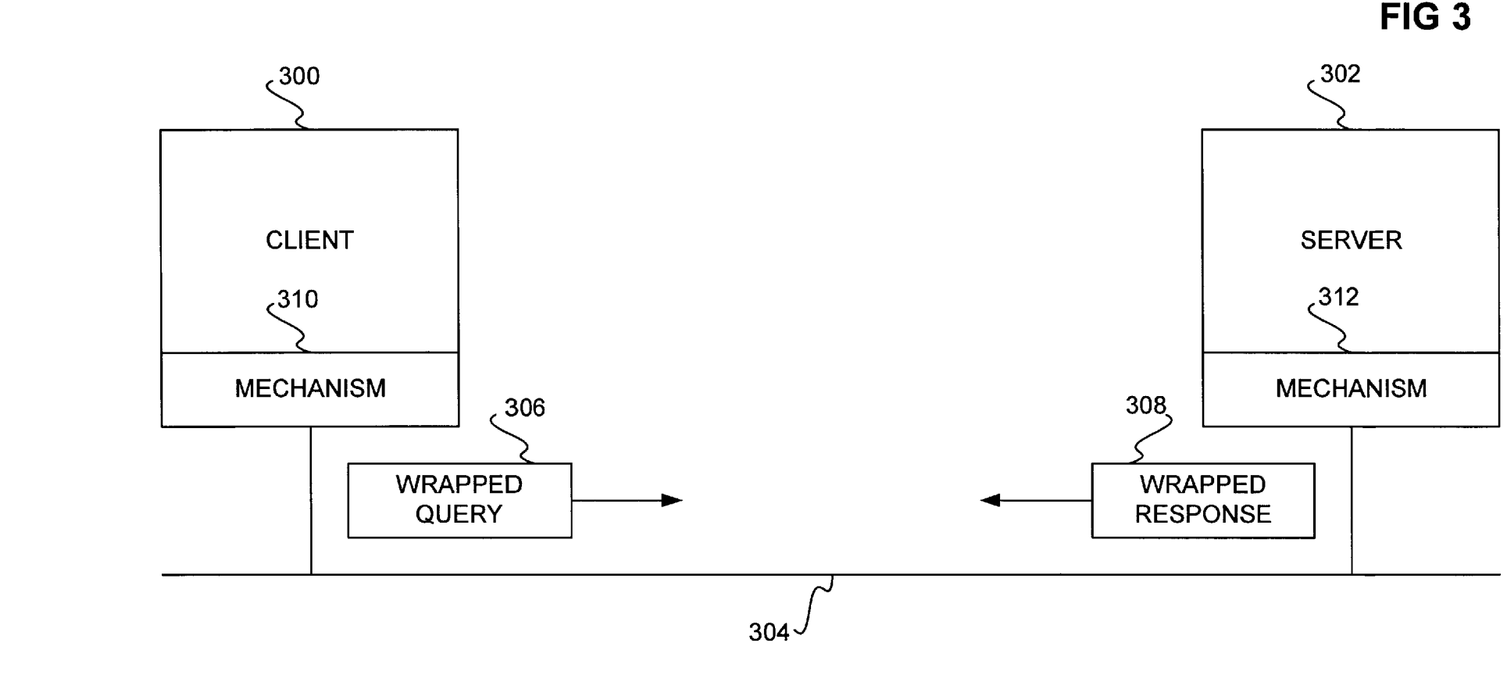

In this section of the detailed description, a description of a system according to an embodiment of the invention is provided. The description is made with reference to FIG. 3. Referring now to FIG. 3, the system thereof includes a client 300 and a server 302. Each of the client 300 and the server 302 can include a computer-readable medium, and a processor coupled thereto, and can be implemented as described already in conjunction with FIG. 1. The client 300 is communicatively coupled to the server 302 via a network 304, such as the Internet, an intranet, or an extranet.

The client 300 sends a database query 306 according to a predetermined query language such as SQL, and which is wrapped according to a predetermined markup language such as XML and according to a predetermined transport protocol such as HTTP. In one embodiment, the query is generated by an application or other computer program within the client 300 (not shown in FIG. 3), which is then passed onto the mechanism 310 for wrapping according to the markup language and the transport protocol. The mechanism 310 in one embodiment is a computer program executed by a processor of the client 300 from a computer-readable medium thereof.

In response to receipt of the wrapped query 306, the server 302 sends a database response 308 according to a predetermined query language such as SQL, which is also wrapped according to a predetermined markup language such as XML and according to a predetermined transport protocol such as HTTP. In one embodiment, the response is generated by an application or other computer program within the server 302 (not shown in FIG. 3), which is then passed onto the mechanism 312 for wrapping according to the markup language and the transport protocol. The mechanism 312 in one embodiment is a computer program executed by a processor of the server 302 from a computer-readable medium thereof.

The system of FIG. 3 thus illustrates advantages of the invention according to at least one embodiment. Clients and servers communicatively coupled to a common network such as the Internet, and which have inherent database capability such as SQL capability, are able to interact with one another in a database context. The queries and responses exchanged among clients and servers are wrapped according to transport protocols and markup languages understood by the other clients and the other servers, and which in one embodiment are standard protocols and markup languages such as HTTP and XML, respectively.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. In a network system that includes a querying computer system and a query processing computer system that are configured to communicate via a transport protocol, and that are both configured to process a markup language, a method for the querying computer system to submit a database query in a format that may be processed by the query processing computer system, the method comprising:

an act of accessing a database query that is structured according to a query language;

an act of wrapping the database query according to a markup language to indicate the start and stop of the database query, and to identify the database query as being a database query;

an act of further wrapping the wrapped database query according to the transport protocol; and an act of outputting the further wrapped database query.

2. The method of claim 1, wherein the markup language comprises eXtensible Markup Language CXML), and the transport protocol comprises HTTP (HyperText Transport Protocol).

3. The method of claim 1, wherein the query language includes a ">" operator, and further comprising an act of translating the ">" operator to ">".

4. The method of claim 1, wherein the query language includes a "<" operator, and further comprising an act of translating the "<" operator to "<".

5. The method of claim 1, wherein the query language includes a "&" operator, and further comprising an act of translating the "&" operator to "&".

6. The method of claim 1, wherein the markup language comprises eXtensible Markup Language (XML).

7. The method of claim 1, wherein the transport protocol comprises HTTP (HyperText Transport Protocol).

8. The method of claim 7, wherein the act of further wrapping the wrapped database query comprises generating one of a SEARCH request, a GET request, and a PROPFIND request.

9. The method of claim 1, wherein the database query is directed to a query of a database.

10. The method of claim 1, wherein the database query is directed to a query of one of resource and a hierarchy of resources.

11. The method of claim 10, wherein the database query specifies at least one property of the resource.

12. The method of claim 11, wherein the at least one property defaults to a string data type.

13. The method of claim 11, wherein the database query casts the at least one property as a particular data type.

14. The method of claim 1, wherein the act of accessing a database query comprises an act of generating the database query.

15. The method of claim 1, wherein the act of outputting the further wrapped database query comprises an act of submitting the further wrapped database query from the querying computer system to the query processing computer system over a network.

16. The method of claim 15, further comprising an act of submitting a database response to the database query from the query processing computer system to the querying computer system over the network.

17. A computer program product for use in a network system that includes a querying computer system and a query processing computer system that are configured to communicate via a transport protocol, and that are both configured to process a markup language, the computer program product for implementing a method for the querying computer system to submit a database query in a format that may be processed by the query processing computer system, the computer program product comprising one or more machine-readable media having machine-executable instructions stored thereon that, when executed by a processor, perform the following acts:

causing a database query to be accessed, the database query being structured according to a query language;

wrapping the database query according to a markup language to indicate the start and stop of the database query, and to identify the database query as being a database query;

further wrapping the wrapped database query according to the transport protocol; and causing the database query to be submitted from the querying computer system to the query processing computer system over a network.

18. The computer program product of claim 17, wherein the network comprises one of: the Internet, an intranet, and an extranet.

19. The computer program product of claim 17, wherein the markup language comprises extensible Markup Language (XML), and the transport protocol comprises HTTP (HyperText Transport Protocol).

20. A computer program product for use in a network system that includes a querying computer system and a query processing computer system that are configured to communicate via a transport protocol, and that are both configured to process a markup language, the computer program product for implementing a method for the query processing computer system to respond to a database query in a format that may be processed by the querying computer system, the computer program product comprising one or more machine-readable media having instructions stored thereon that, when executed by a processor, perform the following acts:

generating a database response to a database query that is structured according to a query language;

wrapping the database response according to the markup language to indicate the start and stop of the database response, and to identify the database response as being a database response;

further wrapping the wrapped database response according to the transport protocol; and causing the database response to be submitted from the query processing computer system to the querying computer system over the network.

21. The computer program product of claim 20, wherein the network comprises one of: the Internet, an intranet, and an extranet.

22. The computer program product of claim 20, wherein the markup language comprises eXtensible Markup Language (XML), and the transport protocol comprises HTTP (HyperText Transport Protocol).

23. A computerized system comprising:
a querying computer system configured to send a database query that is structured according to a query language, and that is wrapped according to a markup language to indicate the start and stop of the database query and to identify the database query as being a database query, and that is wrapped according to a transport protocol; and
a query processing computer system configured to receive the database query and generate and send a database response thereto according to the query language, the database response being wrapped according to the markup language and according to the transport protocol.

24. The system of claim 23, wherein at least one of the query processing computer system and the querying computer system comprise a computer-readable medium and a processor coupled thereto.

25. The system of claim 23, wherein the query processing computer system is communicatively coupled to the querying computer system over a network.

26. The system of claim 23, wherein the markup language comprises eXtensible Markup Language (XML), and the transport protocol comprises HTTP (HyperText Transport Protocol).

27. The method of claim 1, wherein the query language comprises SQL (Structured Query Language).

28. The computer program product of claim 17, wherein the query language comprises SQL (Structured Query Language).

29. The computer program product of claim 17, wherein the markup language comprises eXtensible Markup Language (XML).

30. The computer program product of claim 17, wherein the transport protocol comprises HTTP (HyperText Transport Protocol).

31. The computer program product of claim 17, wherein the machine-executable instructions for further wrapping the wrapped database query comprises machine-executable instructions for generating one of a SEARCH request, a GET request, and a PROPFIND request.

* * * * *

UNITED STATES PATENT AND TRADEMARK OFFICE
CERTIFICATE OF CORRECTION

PATENT NO. : 6,356,906 B1  Page 1 of 1
DATED : March 12, 2002
INVENTOR(S) : Lisa M. Lippert, Joel M. Soderberg and Saveen V. Reddy It is certified that error appears in the above-identified patent and that said Letters Patent is hereby corrected as shown below:

Column 1,
Line 10, after "such standard" change "requestresponse" to -- request-response --

Column 2,
Line 24, after "standard" change "requestresponse" to -- request-response --

Column 9,
Line 7, after "Adaptation of" change "SOL" to -- SQL --

Column 11,
Line 33, after "eXtensible Markup Language" change "CXML)" to -- (XML) --

Signed and Sealed this

Seventeenth Day of December, 2002

JAMES E. ROGAN
*Director of the United States Patent and Trademark Office*